(12) United States Patent
Albrecht et al.

(10) Patent No.: US 9,541,185 B2
(45) Date of Patent: Jan. 10, 2017

(54) PULLEY DEVICE FOR A CHAIN OR BELT AND MOTOR VEHICLE EQUIPPED WITH SUCH A DEVICE

(71) Applicants: Dirk Albrecht, Eschweiler (DE); Romuald Lescorail, Saint Cyr sur Loire (FR); Gwenoel Leteil, Souvigne (FR); Thomas Nicaud, Mettray (FR)

(72) Inventors: Dirk Albrecht, Eschweiler (DE); Romuald Lescorail, Saint Cyr sur Loire (FR); Gwenoel Leteil, Souvigne (FR); Thomas Nicaud, Mettray (FR)

(73) Assignee: AKTIEBOLAGET SKF, Gothenburg (SE)

( * ) Notice: Subject to any disclaimer, the term of this patent is extended or adjusted under 35 U.S.C. 154(b) by 165 days.

(21) Appl. No.: 14/541,544

(22) Filed: Nov. 14, 2014

(65) Prior Publication Data

US 2015/0141185 A1  May 21, 2015

(30) Foreign Application Priority Data

Nov. 14, 2013 (FR) ...................................... 13 61115
Jul. 18, 2014 (FR) ...................................... 14 56981

(51) Int. Cl.
*F16H 55/36* (2006.01)
*F16H 7/20* (2006.01)
(Continued)

(52) U.S. Cl.
CPC ............ *F16H 55/36* (2013.01); *F16H 7/1281* (2013.01); *F16H 7/20* (2013.01); *F16B 41/002* (2013.01);
(Continued)

(58) Field of Classification Search
CPC .... F16H 55/36; F16H 2007/0865; F16H 7/20; F16H 7/1281; F16H 2007/0842; F16B 41/002

See application file for complete search history.

(56) References Cited

U.S. PATENT DOCUMENTS 3,545,294 A * 12/1970 Dankowski ........... F16H 7/1281
474/112
5,015,216 A * 5/1991 Brandenstein ........ F16H 7/1281
474/101

(Continued)

FOREIGN PATENT DOCUMENTS

DE 19836191 A1 2/2000
DE 102005033565 A1 1/2007
FR 2923281 A1 5/2009

*Primary Examiner* — William E Dondero
*Assistant Examiner* — Robert T Reese
(74) *Attorney, Agent, or Firm* — Bryan Peckjian; SKF USA Inc. Patent Dept.

(57) ABSTRACT

The inventive pulley device for one of a chain and belt provides an inner ring, an outer ring, at least one row of rolling elements mounted in a rolling chamber defined between the inner ring and the outer ring, a pulley secured in rotation with the outer ring and provided with an outer radial surface for engagement with one of a chain and a belt. A screw for mounting on a support is housed radially inside the inner ring and a mounting support element is provided with a passage opening for the screw. The opening is tapped, with a complementary tapping of a thread arranged on the screw, the screw is provided with a groove, offset relative to the thread along a longitudinal axis (X40) of the screw and in which the tapping of the opening is received.

22 Claims, 6 Drawing Sheets

(51) Int. Cl.
*F16H 7/12* (2006.01)
*F16H 7/08* (2006.01)
*F16B 41/00* (2006.01)

(52) U.S. Cl.
CPC . *F16H 2007/081* (2013.01); *F16H 2007/0842* (2013.01); *F16H 2007/0865* (2013.01)

(56) References Cited

U.S. PATENT DOCUMENTS

| | | | | |
|---|---|---|---|---|
| 5,919,107 | A * | 7/1999 | Stepniak | F16H 7/1281 |
| | | | | 474/112 |
| 6,689,002 | B1 | 2/2004 | Hascoat | |
| 2004/0097313 | A1 | 5/2004 | Singer | |
| 2008/0242523 | A1* | 10/2008 | Stief | F16C 13/006 |
| | | | | 492/7 |
| 2011/0009220 | A1* | 1/2011 | Arnault | B29C 45/1459 |
| | | | | 474/166 |
| 2015/0292603 | A1* | 10/2015 | Cherioux | F16C 33/7886 |
| | | | | 474/166 |
| 2016/0160988 | A1* | 6/2016 | Quincay | F16C 13/006 |
| | | | | 474/166 |

* cited by examiner

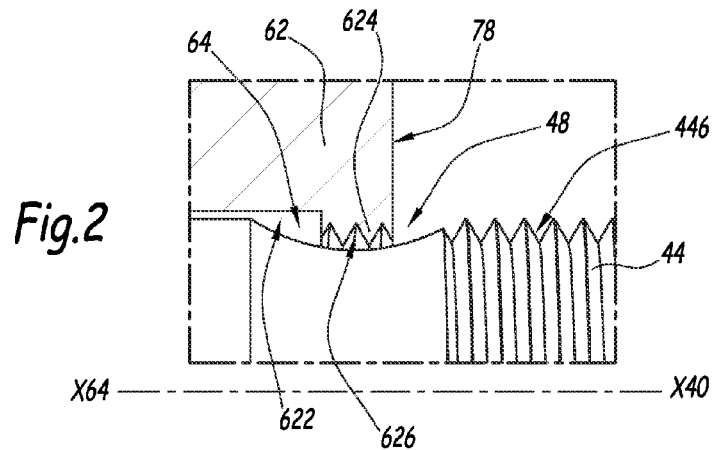
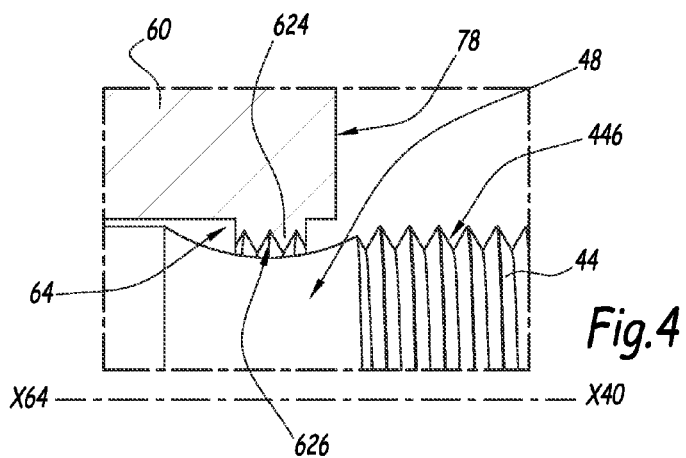
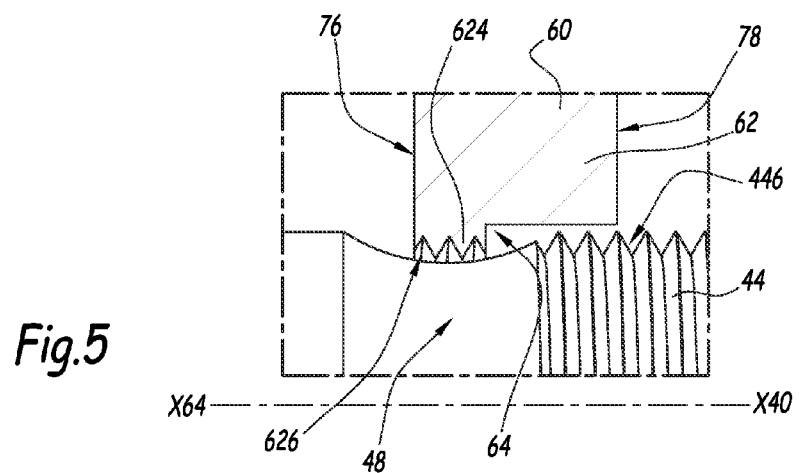

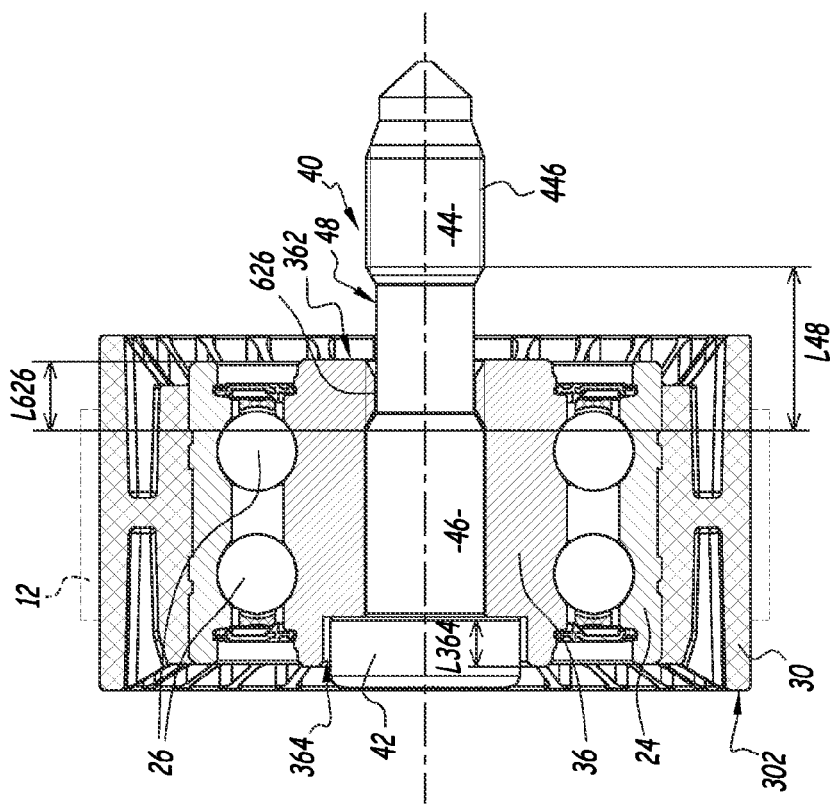
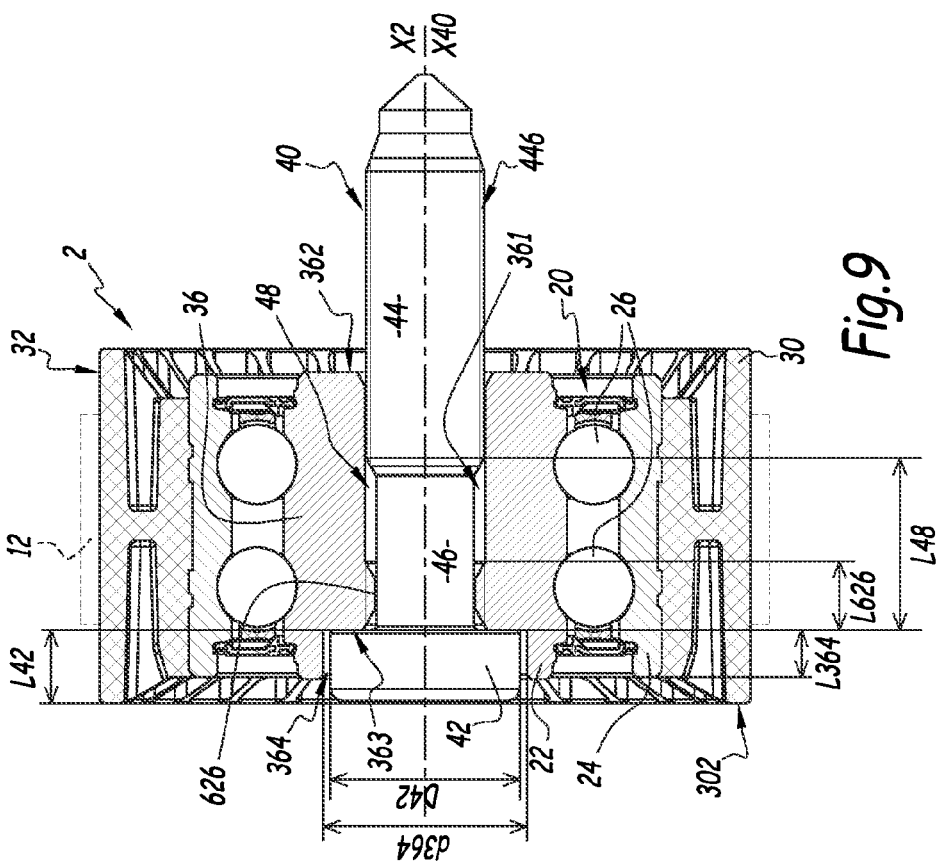

PULLEY DEVICE FOR A CHAIN OR BELT AND MOTOR VEHICLE EQUIPPED WITH SUCH A DEVICE

FIELD OF THE INVENTION

The invention relates to a pulley device as used, in particular, in motor vehicles. Such a device may involve tensioning rollers to tense a chain or belt for transmitting movements, accessory rollers, winders, free pulleys and any other means for support and rotation transmission.

BACKGROUND OF THE INVENTION

When such a pulley device is manufactured, it is generally equipped with a screw whereof one threaded end is designed to penetrate a tapped orifice formed in a support on which the tensioning roller is provided to be mounted. It is appropriate to avoid, as much as possible, any untimely separation of the screw and the rest of the pulley device between the time of manufacture of the device and the time of its mounting on a support, in particular within the engine compartment of a motor vehicle.

To that end, it is known from US-A-2004/097313 to provide, on a separating sleeve of a tensioning roller, protruding elements obtained by mating the edge of a passage opening with a fastening screw. After being mated, these protruding elements rub against a non-threaded part of the screw, once the latter is already in place within the tensioning roller. This requires providing, in the manufacturing line of such a tensioning roller, a specific step for mating the sleeve to produce the protruding elements, which makes that manufacturing line more complex and expensive. Furthermore, the screw cannot be separated from the sleeve, unless the protruding elements are broken or the threading of the screw is deteriorated.

It is also known from FR-A-2,923,281 to overmold, in the bore of the inner ring of the tensioning roller, a bush that in turn defines a through bore for mounting a fastening screw. In the embodiment of FIGS. 4 and 5 of that document, the bush is provided with a threaded portion seeking to favor the axial retention of the screw. The bush is positioned axially withdrawn relative to the outer ring, such that it does not allow any axial force to be reacted. Furthermore, the threaded portion remains engaged with the thread of the screw during the transport of the tensioning roller, from its manufacture site to its mounting site on a motor vehicle. This results in the risk of breakage of the threaded portion or deformation of the thread of the screw.

Furthermore, it is known from DE-A-198 36 191 to provide, in a housing for receiving the screw, a circlip for axially retaining the rod of the screw, which slides along an outer peripheral groove formed on the shaft of the screw. One drawback of this approach pertains to the retention of the circlip in the inner ring of the rolling bearing, which is not sustainable. Thus, the circuit may itself be lost during use of the device. Another drawback of this approach pertains to its bulk. The head of the screw protrudes from the inner ring of the rolling bearing, which is not desirable during the use of the device in a densely occupied volume, such as the engine compartment of a modern motor vehicle.

The present invention aims more particularly to resolve these drawbacks by proposing a new pulley device whereof the manufacturing is cost-effective and which guarantees effective maintenance of its central screw, including before mounting of the pulley device on a support such as the engine block of a motor vehicle.

SUMMARY OF THE INVENTION

To that end, the invention relates to a pulley device for a chain or belt that comprises an inner ring, an outer ring, at least one row of rolling elements mounted in a rolling chamber defined between the inner ring and the outer ring, as well as a pulley secured in rotation with the outer ring and provided with an outer radial surface for engagement with a chain or a belt. This pulley device also comprises a screw for mounting on a support, said screw being housed radially inside the inner ring, and a mounting support element provided with a passage opening for that screw. According to the invention, the opening of the mounting support element is tapped, with a complementary tapping of the thread arranged on the screw, whereas the screw is provided with a groove, offset relative to the thread along a longitudinal axis of that screw and in which the tapping of the opening is received.

Owing to the invention, reversible axial securing can be obtained between the mounting screw on the one hand, and the other component elements of the pulley device on the other hand, including the mounting support element, by screwing the screw into the tapping arranged on the edge of the opening of the support element for the mounting, until that edge is brought to the level of the groove, in a configuration where the tapping arranged on the edge of the mounting support element is no longer in contact with the thread arranged on the screw. Thus, the mounting screw has a certain degree of axial freedom that avoids needlessly biasing that tapping and that thread between the manufacturing time of the pulley device and its mounting on a support element.

Within the meaning of the present invention, the word "tapping" designates the thread arranged inside an opening and that is designed to cooperate with the thread arranged on the outside of the screw.

According to advantageous but optional aspects of the invention, such a pulley device may incorporate one or more of the following features, considered in any technically allowable combination:

- The tapping extends over a number of revolutions comprised between 0.75 and 1.5, preferably between 0.8 and 1.2, still more preferably equal to 1.
- The groove is arranged, along the longitudinal axis of the screw, between the thread and a screw head.
- The groove is adjacent to the thread.
- The ratio between the minimum diameter of the screw at the bottom of the groove on the one hand, and the outer diameter of the thread on the other hand is comprised between 1.1 and 1.3, preferably equal to 1.2.
- The groove is in the shape of a concave toroid segment.
- The mounting support element is a force reacting plate that comprises, in addition to the passage opening for the screw, at least one other passage opening for a connecting member to the support.
- The device comprises a sleeve radially inserted between the inner ring and the screw and bearing against the force reacting plate, that sleeve preferably forming an eccentric for tensioning the chain or belt bearing on the pulley.
- The force reacting plate comprises a connecting arm between two portions of the force reacting plate in which the passage opening of the screw and the other opening are respectively arranged.

The mounting support element is an axial wedge spacer of the pulley device, that spacer being at least partially engaged in a central bore of the inner ring or constituting the ring itself.

The spacer is a sleeve, mounted in the central bore of the inner ring or which constitutes the inner ring, and provided with a direct bearing surface against the support.

The device comprises at least one lateral flange for radial and axial maintenance of the inner and outer rings and the spacer is provided with a direct bearing surface against the support and a direct bearing surface against the lateral flange.

The spacer is formed by a radial and axial maintenance flange for the inner and outer rings.

The mounting support element defines a housing for totally or partially receiving the head of the screw, the axial length of the groove of the screw is strictly greater than the axial length of the tapping and the difference between the axial length of that the groove of the screw and the axial length of the tapping is greater than or equal to the axial length of the housing for receiving the head of the screw.

The tapping is positioned, within the mounting support element, near the housing for receiving the head of the screw.

The tapping is positioned, within the mounting support element, opposite the housing for receiving the head of the screw.

The housing for receiving the head of the screw has an axial length strictly smaller than the axial length of the head of the screw. Alternatively, the housing for receiving the head of the screw has an axial length greater than or equal to the axial length of the head of the screw.

The housing for receiving the head of the screw is circular and has a flat bottom, perpendicular to a central axis of the device and which surrounds a central bore for receiving the shaft of the screw.

When it is engaged in its receiving housing, the head of the screw does not axially protrude from a lateral surface of the pulley.

The mounting support element is an axial wedging sleeve of the pulley device, that sleeve being at least partially engaged in a central bore of the inner ring or itself constituting that ring, while the sleeve is provided with a direct bearing surface against the support and the housing for receiving the head of the screw is formed in the sleeve, opposite the bearing surface.

The invention also relates to a motor vehicle equipped with a pulley device as mentioned above, that vehicle comprising an engine whereof a fixed part, such as the engine block, constitutes a support for that pulley device that support itself being provided with a tapped orifice for receiving a threaded part of the screw.

BRIEF DESCRIPTION OF THE DRAWINGS

The invention will be better understood and other advantages thereof will appear more clearly in light of the following description of eight embodiments of the pulley device and a motor vehicle according to its principle, provided solely as an example and done in reference to the appended drawings, in which:

FIG. 2 is a larger scale view of detail II in FIG. 1;

FIG. 4 is a view similar to FIG. 2 for a pulley device according to a second embodiment of the invention;

FIG. 5 is a view similar to FIG. 2 for a pulley device according to a third embodiment of the invention;

FIG. 9 is an axial cross-section similar to FIG. 1 for a pulley device according to a seventh embodiment of the invention; and FIG. 10 is an axial cross-section similar to FIG. 1 for a pulley device according to an eighth embodiment of the invention.

DETAILED DESCRIPTION OF THE INVENTION

Figure 1:
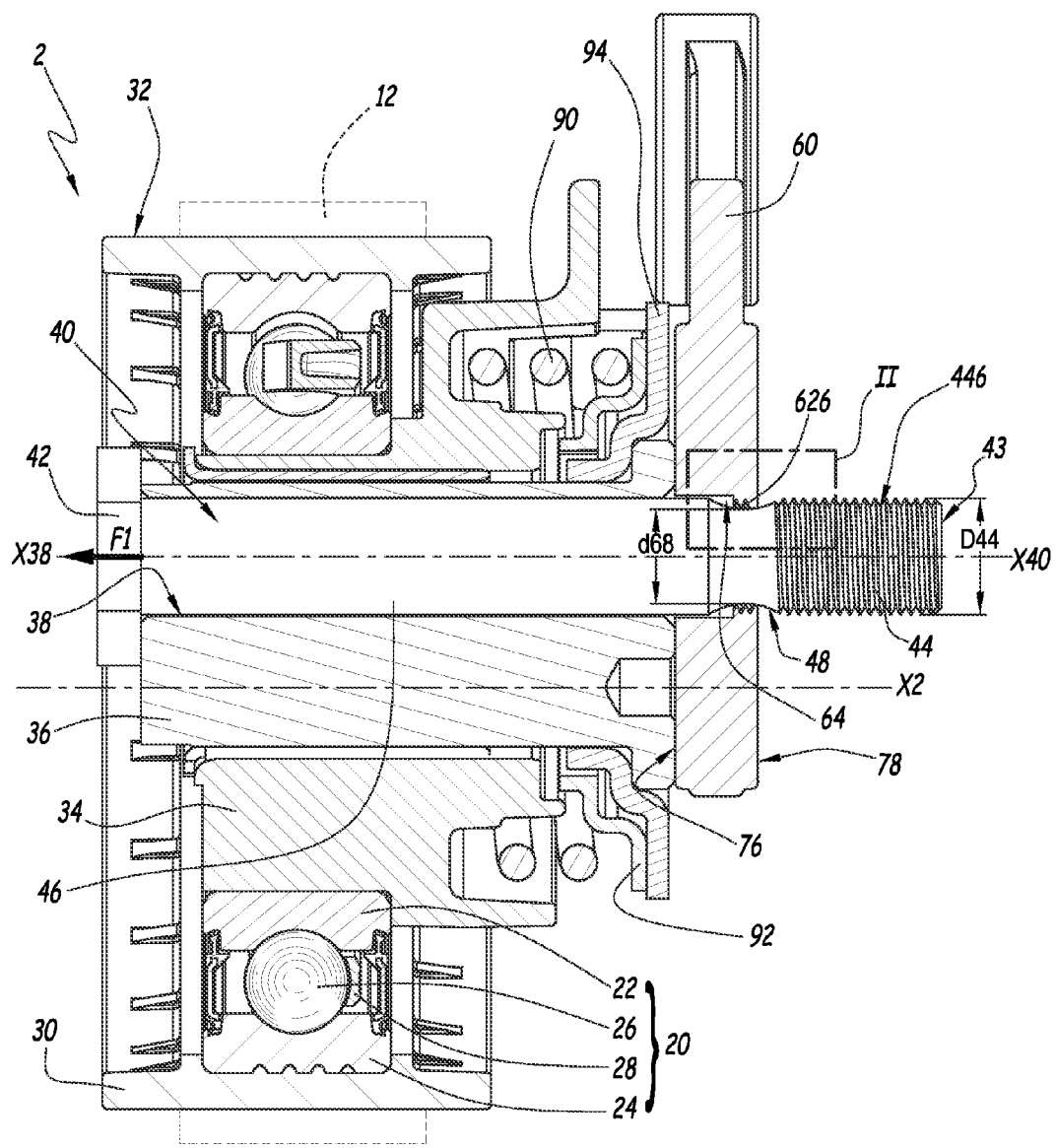
FIG. 1 is an axial cross-section of a pulley device according to a first embodiment of the invention.
Figure 3:
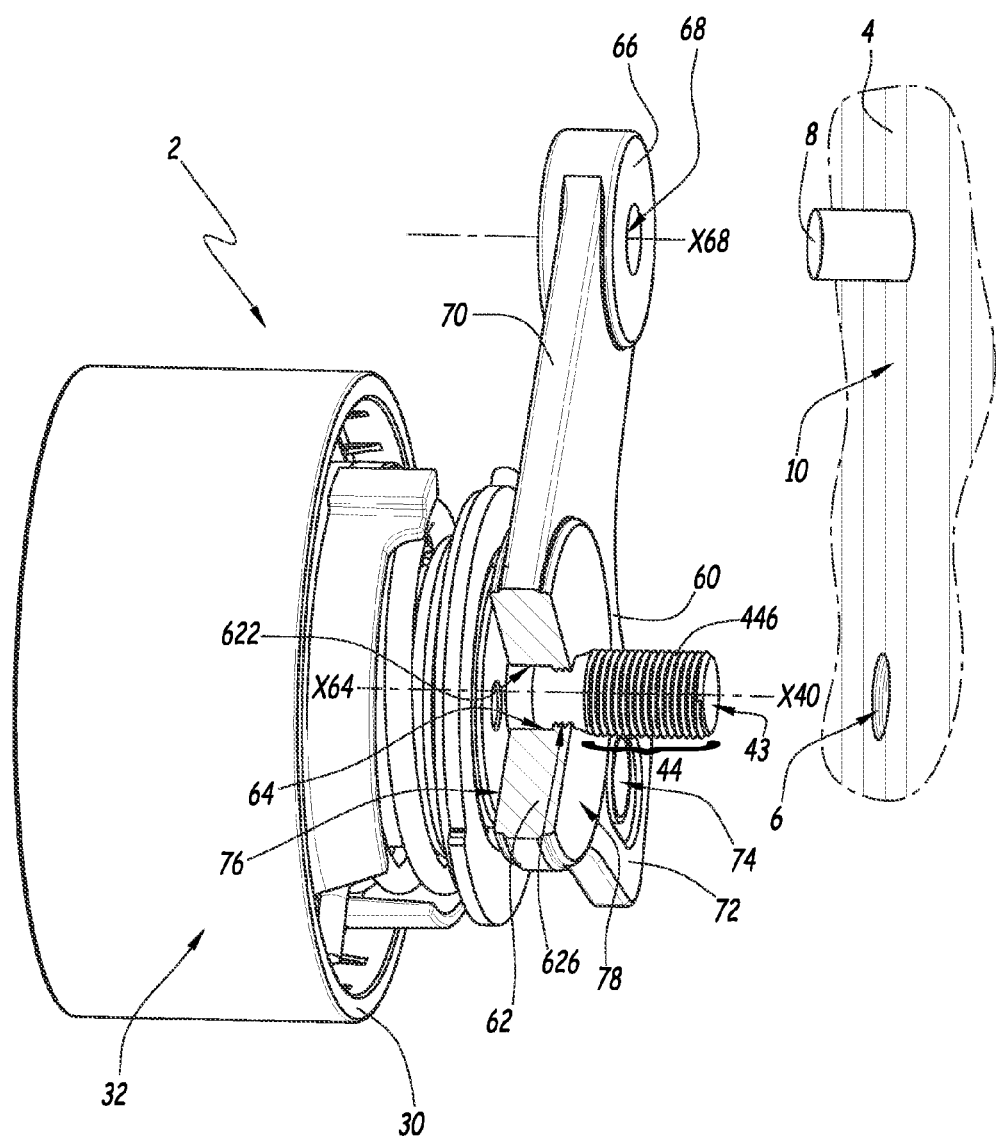
FIG. 3 is a perspective view, with partial cutaway, of the pulley device of FIGS. 1 and 2 and part of a motor vehicle engine block in which that pulley device is designed to be mounted.

The pulley device 2 shown in FIGS. 1 to 3 is a tensioning roller designed to be mounted on an engine block 4 that is equipped with a tapped orifice 6 and a slug 8 protruding relative to a flat surface 10 of the engine block 4.

The tensioning roller 2 comprises a ball bearing 20 that is formed by an inner ring 22, an outer ring 24 and a single row of balls 26 kept in position by a cage 28. Alternatively, the balls 26 may be replaced by other rolling elements, such as rollers or needles. It is also possible to provide that the rolling bearing 20 comprises several rows of rolling elements.

A pulley 30 is immobilized on the outer ring 22, for example by gluing, overmolding or by tight mounting or crimping of a metal pulley on the outer ring. The outer radial surface of the pulley 30, i.e., the surface of the pulley oriented radially toward the outside relative to a central axis X2 of the tensioning roller 2, is denoted using reference 32.

The surface 32 is provided to receive, by bearing, a belt 12 that is shown in mixed lines, only in FIG. 1. In place of a belt, a chain may be mounted around the surface 32, the geometry of which has been adapted.

The tensioning roller 2 also comprises a hub 34 secured in rotation with the ring 22, which defines a central bore in which a sleeve 36 is housed that forms an eccentric and that is provided with a bore 38 centered on an axis X38 parallel to the axis X2 and offset relative thereto. A screw 40, received in the bore 38, comprises a head 42 and a threaded part 44 arranged at the end of the rod 46 of the screw 40 opposite the head 42. Reference X40 designates the longitudinal axis of the screw 40 that is superimposed on the axis X38 in the configuration where the screw 40 is mounted in the sleeve 36.

The tensioning roller 2 is also provided with a mechanism (not shown) for adjusting the position of the sleeve 36 around the axes X38 and X40, which makes it possible to move the rolling bearing 20 and the pulley 30 angularly around those axes, in order to adjust the tension of the pulley 12 when the tensioning roller 2 is attached on the engine block 4 by screwing the threaded part 44 into the orifice 6.

The tensioning roller 2 also comprises a force reacting plate 60 that is designed to bear against the surface 10 of the engine block 4 and undergo an axial compression force, paralleled to the axes X2 and X40, that force being exerted between the sleeve 36 and the engine block 4. That force reacting plate 60 therefore constitutes a support element for mounting the device 2 on the engine block 4.

As more particularly shown by FIG. 3, the force reacting plate 60 comprises a first portion 62 in which an opening 64 for passage of the end 44 is arranged. The opening 64 is centered on an axis X64 superimposed on the axis X40 in the mounted configuration of the tensioning roller 2. The force reacting plate 60 also comprises a second portion 66 provided with an opening 68 centered on an axis X68 parallel to the central axis X64 and that is designed to receive the slug 8, in the configuration where the tensioning roller 2 is mounted on the engine block 4.

Alternatively, the slug 8 is replaced by a tapped orifice comparable to the orifice 6 and a screw is inserted and screwed in the tapped orifice through the openings 68.

The plate 60 also comprises a third portion 62 in which a third opening 74 is designed to receive a slug similar to the slug 8, which is not shown in FIG. 3 for clarity of the drawing. Alternatively, a screw can be inserted into the opening 74, as mentioned regarding the openings 68.

The reference 622 designates the inner radial surface of the first portion 62 that surrounds the opening 64. That inner radial surface is circular and centered on the axis X64.

References 76 and 78 respectively denote the lateral surfaces of the plate 60 oriented toward the rolling bearing 20 on the one hand, and opposite that rolling bearing on the other hand. In the vicinity of the surface 78, the opening 64 is delimited by a part 624 of the portion 62 that has a tapping 626 complementary to a thread 446 arranged on the threaded part 44 of the screw 40. In particular, the thread 446 and the tapping 626 have the same pitch. They can be of the metric type, for example type M8 or DIN 508.

The screw 40 is also provided with a groove 48 that is positioned along the axis X40 between the head 42 and the threaded part 44. Thus, the groove 48 is axially offset, along the axis X40, relative to the threaded part 44. More specifically, the groove 48 is adjacent to the part 44, on the side of that part 44 opposite the end 43 of the screw 40, which in turn is opposite the head 42.

The groove 48 has a rounded bottom. In particular, that groove can be defined as a concave toroid segment. Reference d48 denotes the minimum diameter of the screw 40 at the groove 48, i.e., the diameter of the screw 40 at the bottom of the groove 48. Reference D44 also denotes the maximum diameter of the screw 40 at the part 44, that diameter being measured at the peak of the teeth of the thread 446. The ratio d48/d44 is comprised between 1.1 and 1.3, preferably equal to 1.2.

Furthermore, the tapping 626 extends over an annular circumference, inside the portion 62 that extends between three quarters of a revolution and one and one half revolutions. As illustrated in FIGS. 1 to 5, this tapping 626 extends over 3 revolutions. Preferably, it can extend between 0.8 and 1.2 revolutions, preferably over one revolution.

The tensioning roller 2 also comprises a spring 90 for tensioning the belt 12 as well as flanges 92 and 94. The spring 90 is housed between the hub 34 and the flanges 92 and 94.

During the manufacture of the roller 2, its component elements are assembled, in particular by inserting the screw 40 into the bore 38 and scoring the threaded part 44 through the opening 64, by cooperation between the thread 446 and the tapping 626. The end 43 of the screw 40 is inserted into the opening 64 on the side of the lateral surface 76 and it is screwed into the tapping 626 until the part 44 completely protrudes from the opening 64, past the surface 78. One then achieves the configuration of FIGS. 1 and 2, where the part 624 is positioned across from the groove 48, such that the tapping 626 is received in that groove, without being engaged with the thread 446.

In case of axial force parallel to the axis X40 tending to extract the screw 40 from the plate 60, in the direction of arrow F1 in FIG. 1, the thread of the threading 446 furthest from the end 43 comes into contact with the single thread or first thread of the tapping 626, closest to the surface 78. Since the thread 446 and the tapping 626 are complementary, the surfaces of those first threads are parallel and come into surface bearing against one another, which allows them to effectively withstand the tearing force exerted in the direction of the arrow F1.

Thus, the assembly of the roller 2 is kept in a configuration ready for use so that it can be mounted on the engine block 4, without risk of deterioration.

However, it remains possible to extract the screw 40 from the plate 60, by unscrewing it through the opening 64, by cooperation between the threading 446 and the tapping 626. This does not require having an irreversible action on the force reacting plate 60.

In the second to eighth embodiments of the invention shown in FIGS. 4 to 10, the elements similar to those of the first embodiment bear the same references.

Hereinafter, we primarily describe the differences between each of these embodiments and the first.

In the second embodiment, the part 624 of the force reacting plate 60 that is equipped with the tapping 626 is situated in an intermediate zone between the lateral surfaces 76 and 78 of the force reacting plate 60.

In the embodiment of FIG. 5, this part 624 is positioned near the lateral surface 76 turned toward the bearing 20.

Figure 6:
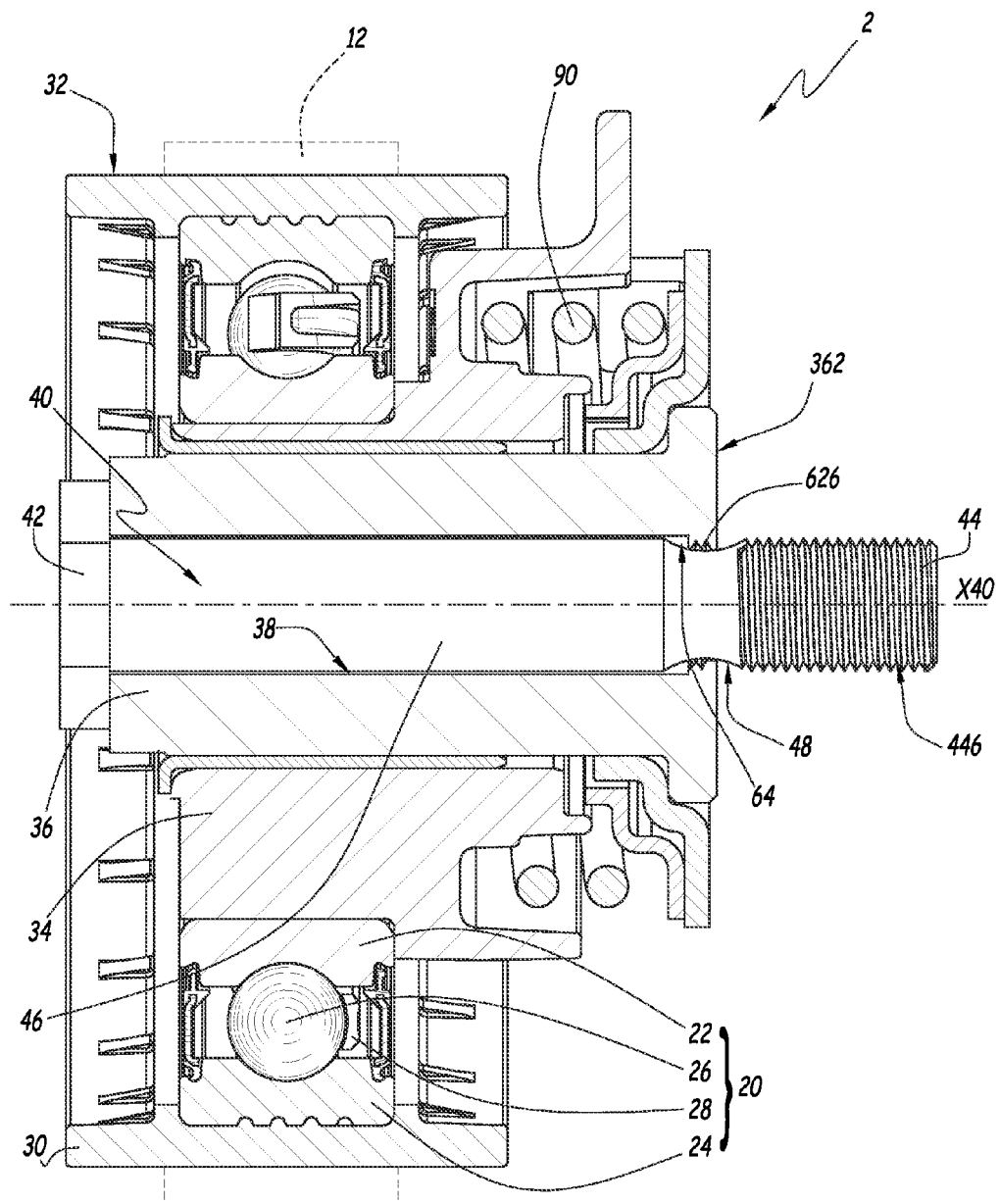
FIG. 6 is an axial cross-section similar to FIG. 1 for a pulley device according to a fourth embodiment of the invention.

In the embodiment of FIG. 6, no force reacting plate is used comparable to the plate 60 of the first embodiment. A sleeve 36, which is inserted into a central bore of a means 34, is provided with a surface 362 for bearing on a support, such as the engine block 4 mentioned regarding the first embodiment. In other words, the surface 362 of the sleeve 36 performs the same function as the surface 78 of the force reacting plate 60 of the first embodiment and the sleeve 36 forms a mounting support element for mounting on the engine block. While being engaged in the central bore of the hub 34, the sleeve 36 is mounted in the central bore of the inner ring 22 of the rolling bearing 20 of this embodiment.

Near the surface 362, the sleeve 36 is provided with an opening 64 for the passage of a threaded end 44 of a screw 40. As in the first embodiment, this opening 64 is equipped with a tapping 626, binary with a thread 446 arranged on the part 44. Furthermore, the screw 40 bears a groove 48 similar to that of the first embodiment.

In this embodiment, the sleeve 36 acts as a spacer, since it is provided to withstand an axial compression force exerted by the head 42 of the screw 40 on the one hand, and by a surface of the engine block 4 bearing against the surface 362 on the other hand.

Figure 7:
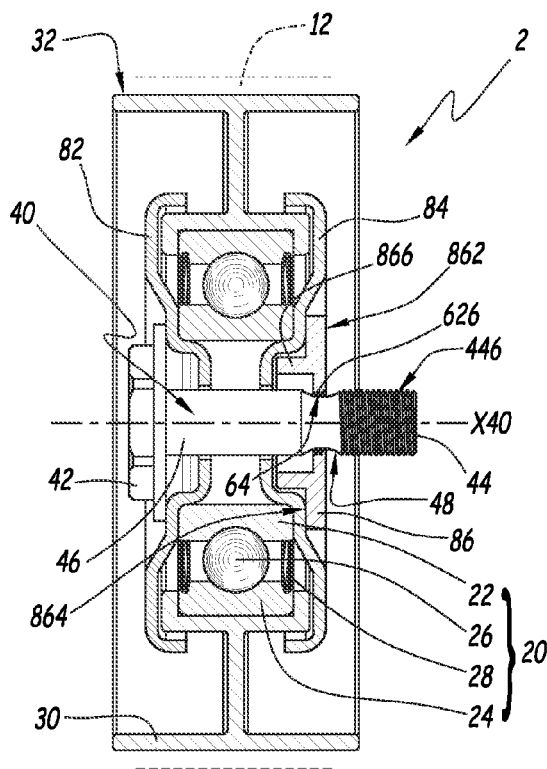
FIG. 7 is an axial cross-section similar to FIG. 1 for a pulley device according to a fifth embodiment of the invention.

In the embodiment of FIG. 7, the rolling bearing 20 is driven in toward two flanges 82 and 84 obtained by cutting and folding a sheet metal flank. More precisely, the flanges 82 and 84 make it possible to maintain, radially and axially relative to a central axis X40 defined by the screw 40, the component elements of the rolling bearing 20, including the rings 22 and 24. The pulley 30 has an I-shaped section, with an inner radial side that caps the outer ring 24 and an outer radial side defining the surface 32 on which a belt 12 rests. These inner and outer radial sides are connected by an annular web.

A spacer 86, mounted adjacent to the flange 84, on the side opposite the head 42 of the screw 40 defines a surface 862 provided to bear against an engine block, like that mentioned relative to the first embodiment. The spacer 86 thus forms a mounting support element for mounting the pulley device 2 on the engine block. The spacer 86 also has an annular surface 864 for axial bearing against the flange 84, at the radial level of the inner ring 22 of the rolling bearing 20.

The spacer 86 also comprises an annular portion 866 that engages in an inner radial space defined by the flange 84, radially to the inside of the ring 22. Thus, the spacer 86 is partially engaged in the central bore of the inner ring 22.

Near the surface 862, the spacer 86 is provided with an opening 84 for passage of a threaded part 44 of the screw 40, that opening being bordered by a tapping 636, as in the preceding embodiments. Furthermore, the screw 40 bears a groove 48 similar to that of the preceding embodiments.

Figure 8:
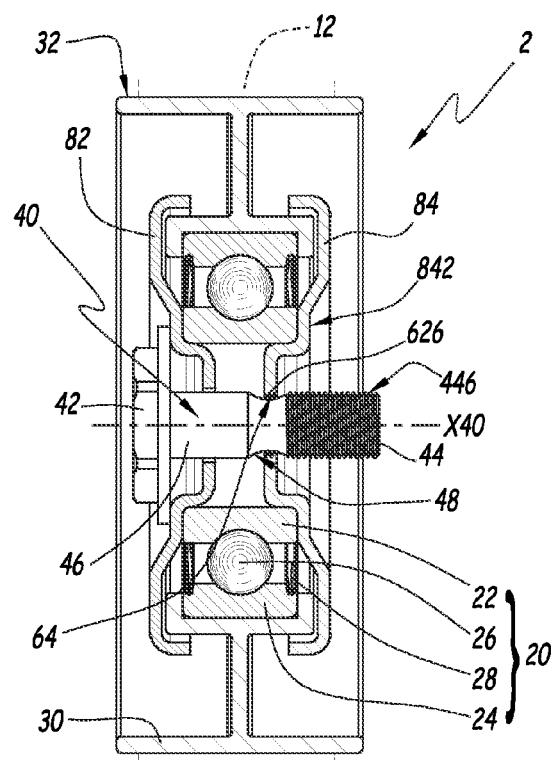
FIG. 8 is an axial cross-section similar to FIG. 1 for a pulley device according to a sixth embodiment of the invention.

The embodiment of FIG. 8 is comparable to that of FIG. 7 and differs therefrom by the fact that it is the flange 84 that acts as a spacer and a mounting support element, since it is provided with a bearing surface 842 against a surface of the engine block. In that case, the central opening 64 of the flange 84 is tapped, with a tapping 626 complementary to a thread 446 arranged on a part 44 of the screw 40 opposite its head 42.

In the embodiments of FIGS. 7 and 8, the spacer 86 and the flange 84 are respectively adapted to undergo an axial compression force exerted between the engine block and the inner ring 22 of the rolling bearing 20.

In the embodiment of FIG. 9, the mounting support element is made up of a sleeve 36 that constitutes the inner ring 22 of the rolling bearing 20, which comprises two rows of balls 26. In other words, compared to the embodiment of FIG. 6, the inner ring 22 of the rolling bearing 20 and the sleeve 36, which forms a spacer, are formed by the same piece.

Opposite its direct bearing surface 362 against a support, such as the support 4 visible in FIG. 3, the sleeve 36 is provided with a circular housing 364 in which the head 42 of the screw 40 is engaged when the latter is in place within the tensioning roller 2.

As shown in FIG. 9, only part of the head 42 is received in the housing 364, another part of that head protruding past that housing, without, however, protruding axially past the pulley 30.

Reference 361 denotes the central bore of the sleeve 36, which is surrounded by the bottom 363 of the housing 364 and in which the shaft 46 of the screw 40 is received. This bottom 363 is flat and perpendicular to the central axis X2 of the tensioning roller 2, which is combined with the longitudinal axis X40 of the screw 40.

The sleeve 36 is equipped with a tapping 626 designed to cooperate with a thread 446 arranged on the shaft of the screw 40. A groove 48 is defined, along the shaft 46 of the screw 40, between the head 42 and the threaded part 44 that is provided with the thread 446.

Reference D42 denotes the outer diameter of the head 42 of the screw 4 and d364 denotes the inner diameter of the housing 364. The diameter d364 is strictly larger than the diameter D42, to make it possible to house the head 42 in the housing 364.

Reference L364 denotes the length of the housing 34, measured parallel to the axis X2, and L42 denotes the length of the head 42 of the screw 4, measured parallel to the axis X40. In the embodiment of FIG. 9, the length L42 is strictly larger than the length L34. In other words, when the screw 40 is installed in the bore 361, with its head 42 bearing against the bottom 363, that head protrudes from the housing 364 along the axis X2. In that configuration, the head 42 does not protrude axially from the axial surface 302 of the pulley 30 opposite the support 4, i.e., opposite the surface 362.

Reference L48 denotes the axial length of the groove 48 measured parallel to the axis X40. Reference L626 denotes the axial length of the tapping 626 measured parallel to the axis X2.

The length L48 is strictly larger than the length L626, which makes it possible for the screw 40 to slide along the axis X2 while the tapping 626 remains engaged in the groove 48, between the head 42 and the threaded part 44. Furthermore, the difference Δ between the axial length L48 and the axial length L626 is greater than or equal to the axial length L364 of the housing 364. This gives the relationship:

$$L48-L626=\Delta \geq L364 \quad \text{(Equation 1)}.$$

This relationship makes it possible to completely remove the head 42 from the housing 364 when the screw 40 translates along the axis X2, opposite the surface 362. This makes it possible to manipulate the screw 40 relatively easily, by taking the head 42 in hand, which is particularly useful when it is appropriate to engage the thread 446 manually in a tapped orifice, such as the tapped orifice 6 of the engine block 4 shown in FIG. 3.

Thus, the screw 40 is easy to manipulate at the beginning of mounting of the tensioning roller 2 on an engine block since, during the tightening of the screw 40 in a tapped orifice, the head 42 bears against the bottom 363 of the housing 364, to the point that it engages in the housing 364, then pushes the surface 362 against the engine block and it does not protrude axially past the lateral surface 302 of the pulley 30.

In this embodiment, the tapping 626 is positioned near the housing 364. In practice, the tapping 626 is adjacent to the housing 364. This is not, however, mandatory.

The embodiment of FIG. 10 is close to that of FIG. 9, and the same elements bear the same references in both embodiments.

In this embodiment, the tapping 626 is arranged not near the housing 364 for receiving the head 42 of the screw 40, but contrariwise, near the surface 362 bearing against the engine block. For the rest, the operation is the same as for the embodiment of FIG. 9. In particular, the axial length L48 of the groove 48 is strictly greater than the axial length L626 of the tapping 626 and the difference Δ between these two lengths is greater than or equal to the axial length L364 of the housing 364. Equation 1 is verified here again.

Alternatively, in the embodiments of FIGS. 9 and 10, the housing 364 can be provided to receive the head 42 completely. In other words, the axial length L364 can be greater than or equal to the axial length L42.

The embodiments and alternatives considered above can be combined to create new embodiments of the invention.

Such an embodiment of the invention may also be provided for all types of pulley device, such as the tensioning rollers described here as well as winders, free pulleys and any other means for support and rotation transmission.

The invention claimed is:

1. A pulley device for one of a chain and belt comprising:
an inner ring,
an outer ring,
at least one row of rolling elements mounted in a rolling chamber defined between the inner ring and the outer ring,
a pulley rotatably secured to the outer ring and provided with an outer radial surface for engagement with the one of chain and belt,
a screw for mounting on a support, the screw being housed radially inside the inner ring,
a mounting support element provided with a passage opening for the screw,
wherein
the opening of the mounting support element is tapped, a complementary tapping of a thread is arranged on the screw, the screw being provided with a groove, offset relative to the thread along a longitudinal axis (X40) of the screw, in which the tapping of the opening is received.

2. The device according to claim 1, wherein the tapping extends over a number of revolutions between 0.75 and 1.5.

3. The device according to claim 1, wherein the groove is arranged, along the longitudinal axis (X40) of the screw, between the thread and a screw head.

4. The device according to claim 1, wherein the groove is adjacent to the thread.

5. The device according to claim 1, wherein the ratio between the minimum diameter (d48) of the screw at the bottom of the groove on the one hand, and the outer diameter (D44) of the thread on the other hand is between 1.1 and 1.3.

6. The device according to claim 1, wherein the groove is in the shape of a concave toroid segment.

7. The device according to claim 1, wherein the mounting support element is a force reacting plate that provides, in addition to the passage opening for the screw, at least one other passage opening for a connecting member to the support.

8. The device according to claim 7, further comprising a sleeve radially inserted between the inner ring and the screw and bearing against the force reacting plate, the sleeve preferably forming an eccentric for tensioning the one of the chain and belt bearing on the pulley.

9. The device according to claim 7, wherein the force reacting plate provides a connecting arm between two portions of the force reacting plate in which the passage opening of the screw and the other opening are respectively arranged.

10. The device according to claim 1, wherein the mounting support element is an axial wedge spacer of the pulley device, the spacer being at least partially engaged in one of a central bore of the inner ring and constituting the ring itself.

11. The device according to claim 10, wherein the spacer is one of a sleeve mounted in the central bore of the inner ring and the inner ring provided with a direct bearing surface against the support.

12. The device according to claim 10, further comprising at least one lateral flange for radial and axial maintenance of the inner and outer rings and the spacer is provided with a direct bearing surface against the support and a direct bearing surface against the lateral flange.

13. The device according to claim 10, wherein the spacer is formed by a radial and axial maintenance flange for the inner and outer rings.

14. The device according to claim 1, wherein the mounting support element defines a housing for totally or partially receiving the head of the screw, the axial length (L48) of the groove of the screw is strictly greater than the axial length (L626) of the tapping and the difference (Δ) between the axial length of that the groove of the screw and the axial length of the tapping is greater than or equal to the axial length (L364) of the housing for receiving the head of the screw.

15. The device according to claim 14, wherein the tapping is positioned, within the mounting support element, near the housing for receiving the head of the screw.

16. The device according to claim 14, wherein the tapping is positioned, within the mounting support element, opposite the housing for receiving the head of the screw.

17. The device according to claim 14, wherein the housing for receiving the head of the screw has an axial length (L364) strictly smaller than the axial length (L42) of the head of the screw.

18. The device according to claim 14, wherein the housing for receiving the head of the screw has an axial length (L364) greater than or equal to the axial length (L42) of the head of the screw.

19. The device according to claim 14, wherein the housing for receiving the head of the screw is circular and has a flat bottom, perpendicular to a central axis (X2) of the device and surrounds a central bore for receiving the shaft of the screw.

20. The device according to claim 14, wherein the head of the screw does not axially protrude from a lateral surface of the pulley when it is engaged in its receiving housing.

21. The device according to claim 1, wherein the mounting support element is an axial wedging sleeve of the pulley device, the sleeve being one of at least partially engaged in a central bore of the inner ring and itself constituting that ring, wherein
the sleeve is provided with a direct bearing surface against the support and the housing for receiving the head of the screw is formed in the sleeve, opposite the bearing surface.

22. A motor vehicle equipped with a pulley device, the pulley device having an inner ring,
an outer ring, at least one row of rolling elements mounted in a rolling chamber defined between the inner ring and the outer ring, a pulley rotatably secured to the outer ring and provided with an outer radial surface for engagement with the one of chain and belt, a screw for mounting on a support, the screw being housed radially inside the inner ring, a mounting support element provided with a passage opening for the screw, wherein the opening of the mounting support element is tapped, a complementary tapping of a thread is arranged on the screw, the screw being provided with a groove, offset relative to the thread along a longitudinal axis (X40) of the screw, in which the tapping of the opening is received,
the vehicle comprising:
an engine having a fixed part that constitutes a support for that pulley device, the support provided with a tapped orifice for receiving a threaded part of the screw.

* * * * *